United States Patent
Hoffmann et al.

(10) Patent No.: US 10,784,568 B1
(45) Date of Patent: Sep. 22, 2020

(54) SYSTEM AND METHOD FOR RETROFITTING DIGITAL ANTENNA ARRAYS

(71) Applicant: Rockwell Collins, Inc., Cedar Rapids, IA (US)

(72) Inventors: Theodore J. Hoffmann, Palo, IA (US); Jonathan A. Lovseth, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/697,627

(22) Filed: Nov. 27, 2019

(51) Int. Cl.
| | |
|---|---|
| H01Q 1/28 | (2006.01) |
| H04B 1/04 | (2006.01) |
| H01Q 21/00 | (2006.01) |
| H04L 25/02 | (2006.01) |
| H01Q 1/24 | (2006.01) |

(52) U.S. Cl.
CPC .............. *H01Q 1/28* (2013.01); *H01Q 1/248* (2013.01); *H01Q 21/0025* (2013.01); *H04B 1/04* (2013.01); *H04L 25/028* (2013.01)

(58) Field of Classification Search
CPC ...... H01Q 1/28; H01Q 21/0025; H01Q 1/248; H04L 25/028; H04B 1/04
See application file for complete search history.

(56) References Cited

U.S. PATENT DOCUMENTS

| | | |
|---|---|---|
| 8,344,935 B1 | 1/2013 | Hoffmann et al. |
| 8,793,037 B1 | 7/2014 | Mulbrook et al. |
| 10,396,845 B2 | 8/2019 | Vassiliou et al. |
| 2012/0083225 A1 | 4/2012 | Rofougaran et al. |
| 2012/0309325 A1 | 12/2012 | Carbone et al. |
| 2014/0049379 A1 | 2/2014 | Pinkham |
| 2017/0248701 A1 | 8/2017 | Adler et al. |
| 2019/0252926 A1* | 8/2019 | Kim ............... H04B 5/0037 |

* cited by examiner

*Primary Examiner* — Jean B Corrielus
(74) *Attorney, Agent, or Firm* — Suiter Swantz pc llo (57) ABSTRACT

An antenna system is disclosed. In embodiments, the antenna system may include a communication sub-system disposed within an aircraft. The communication sub-system may include one or more power supply components configured to generate a direct current (DC) power supply, and a first capacitive coupling device configured to capacitively couple an alternating current (AC) transmit signal to the DC power supply to form an antenna input signal. In embodiments, the antenna system may further include an electrical line configured to transmit the antenna input signal from the communication sub-system to an antenna module. In embodiments, the antenna module may include a second capacitive coupling device configured to de-couple the DC power supply and the AC transmit signal, communication circuitry configured to generate one or more transmission signals based on the AC transmit signal.

15 Claims, 10 Drawing Sheets

SYSTEM AND METHOD FOR RETROFITTING DIGITAL ANTENNA ARRAYS

BACKGROUND

Conventional aircraft antenna/radio systems typically include a communication sub-system (e.g., radio line replaceable unit (LRU)) located within an avionics bay of an aircraft, and a plurality of passive antennas disposed on the exterior of the aircraft. The radio LRU and passive antennas are typically communicatively coupled via a single radio frequency (RF) coaxial cable. As technology evolves, there is a desire to add additional radio and other functionality to the antennas of aircraft. However, the average aircraft typically includes a multitude of antennas, leaving few locations to mount additional antennas with modern functionality. In particular, antennas must be disposed a certain distance from one another in order to avoid co-site interference issues. Additionally, adding additional antennas to an aircraft requires more and/or larger holes to be formed within the exterior walls of the aircraft, which may lead to leaks, increased air movement, and increased moisture to be introduced within the aircraft. Furthermore, re-wiring existing antennas to provide for new functionality may be extremely time consuming and expensive. Therefore, there exists a need in the art for a system and method which cure one or more of the shortfalls of previous approaches identified above.

SUMMARY

An antenna system is disclosed. In embodiments, the antenna system may include a communication sub-system disposed within an aircraft. The communication sub-system may include one or more power supply components configured to generate a direct current (DC) power supply, and a first capacitive coupling device configured to capacitively couple an alternating current (AC) transmit signal to the DC power supply to form an antenna input signal. In embodiments, the antenna system may further include an electrical line configured to transmit the antenna input signal from the communication sub-system to an antenna module. In embodiments, the antenna module may include a second capacitive coupling device configured to de-couple the DC power supply and the AC transmit signal, communication circuitry configured to generate one or more transmission signals based on the AC transmit signal.

In some embodiments of the antenna system, the first capacitive coupling device is configured to capacitively couple the AC transmit signal and one or more additional AC signals to the DC power supply to form the antenna input signal.

In some embodiments of the antenna system, the one or more additional AC signals include an AC clock signal including clock synchronization data.

In some embodiments of the antenna system, the one or more additional AC signals include an AC control signal including one or more control commands configured to selectively adjust one or more characteristics of the antenna module.

In some embodiments of the antenna system, the antenna input signal includes the AC transmit signal at a first frequency range, and the one or more additional AC signals at one or more additional frequency ranges different from the first frequency range.

In some embodiments of the antenna system, the communication circuitry of the antenna module is further configured to generate one or more AC feedback signals, and transmit the one or more AC feedback signals to the communication sub-system via the second capacitive coupling device and the electrical line.

In some embodiments of the antenna system, the one or more AC feedback signals comprise an antenna module status signal.

In some embodiments of the antenna system, the communication circuitry of the antenna module is further configured to receive one or more signals from one or more transmitting devices and generate a one or more AC receive signals based on the one or more received signals.

In some embodiments of the antenna system, the second capacitive coupling device is further configured to capacitively couple the one or more AC receive signals to the DC power supply, wherein the electrical line is then configured to transmit the one or more AC receive signals from the antenna module to the communication sub-system.

In some embodiments of the antenna system, the AC transmit signal comprises an analog AC transmit signal.

In some embodiments of the antenna system, the AC transmit signal comprises a digital AC transmit signal.

In some embodiments of the antenna system, the antenna module further includes an analog-to-digital converter (ADC) device configured to receive the digital AC transmit signal and generate an analog AC transmit signal, wherein the communication circuitry of the antenna module is configured to generate the one or more transmission signals based on the analog AC transmit signal.

In some embodiments of the antenna system, the electrical line includes a coaxial cable.

In some embodiments of the antenna system, the electrical line is routed from the communication sub-system to the antenna module through a port within an exterior surface of the pressure vessel of the aircraft.

A method of operating an antenna system is disclosed. In embodiments, the method includes: generating a direct current (DC) power supply with one or more power supply components of a communication sub-system; capacitively coupling an AC transmit signal to the DC power supply to form an antenna input signal with a first capacitive coupling device; transmitting the antenna input signal from the communication sub-system to an antenna module; de-coupling the DC power supply and the AC transmit signal with a second capacitive coupling device; and transmitting one or more transmission signals with communication circuitry of the antenna module, the transmission signals based on the AC transmit signal.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Conventional aircraft antenna/radio systems typically include a communication sub-system (e.g., radio LRU) located within an avionics bay of an aircraft, and a plurality of passive antennas disposed on the exterior of the aircraft. The radio LRU and passive antennas are typically communicatively coupled via a single radio frequency (RF) coaxial cable. As technology evolves, there is a desire to add additional radio and other functionality to the antennas of aircraft. However, the average aircraft typically includes a multitude of antennas, leaving few locations to mount additional antennas with added functionality. In particular, antennas must be disposed a certain distance from one another in order to avoid co-site interference issues. Additionally, adding additional antennas to an aircraft requires more and/or larger holes to be formed within the exterior walls of the aircraft, which may lead to leaks, increased air movement, and increased moisture to be introduced within the aircraft. Furthermore, re-wiring existing antennas to provide for new functionality may be extremely time consuming and expensive.

Accordingly, embodiments of the present disclosure are directed to a system and method which cure one or more of the shortfalls of previous approaches identified above. Embodiments of the present disclosure are directed to an antenna system configured to enable antenna modules with additional functionality. In particular, embodiments of the present disclosure are directed to an antenna system configured to provide for digitally-enabled antennas and active electrically scanned arrays (AESAs) over a pre-existing coaxial cable. Additional embodiments of the present disclosure are directed to a method for retrofitting pre-existing aircraft antenna systems in order to enable modern antenna modules with improved functionality.

It is contemplated herein that embodiments of the present disclosure may enable modern antenna modules with improved functionality without over-crowding an exterior surface of an aircraft. In particular, embodiments of the present disclosure may allow operators to replace existing antenna modules with newer, modern antenna modules without having to re-wire the existing antenna systems completely. Accordingly, the antenna system and method of the present disclosure may provide for improved antenna systems, while avoiding the drawbacks associated with adding antennas and/or rewiring existing antenna systems.

Reference will now be made in detail to the subject matter disclosed, which is illustrated in the accompanying drawings.

Figure 1:
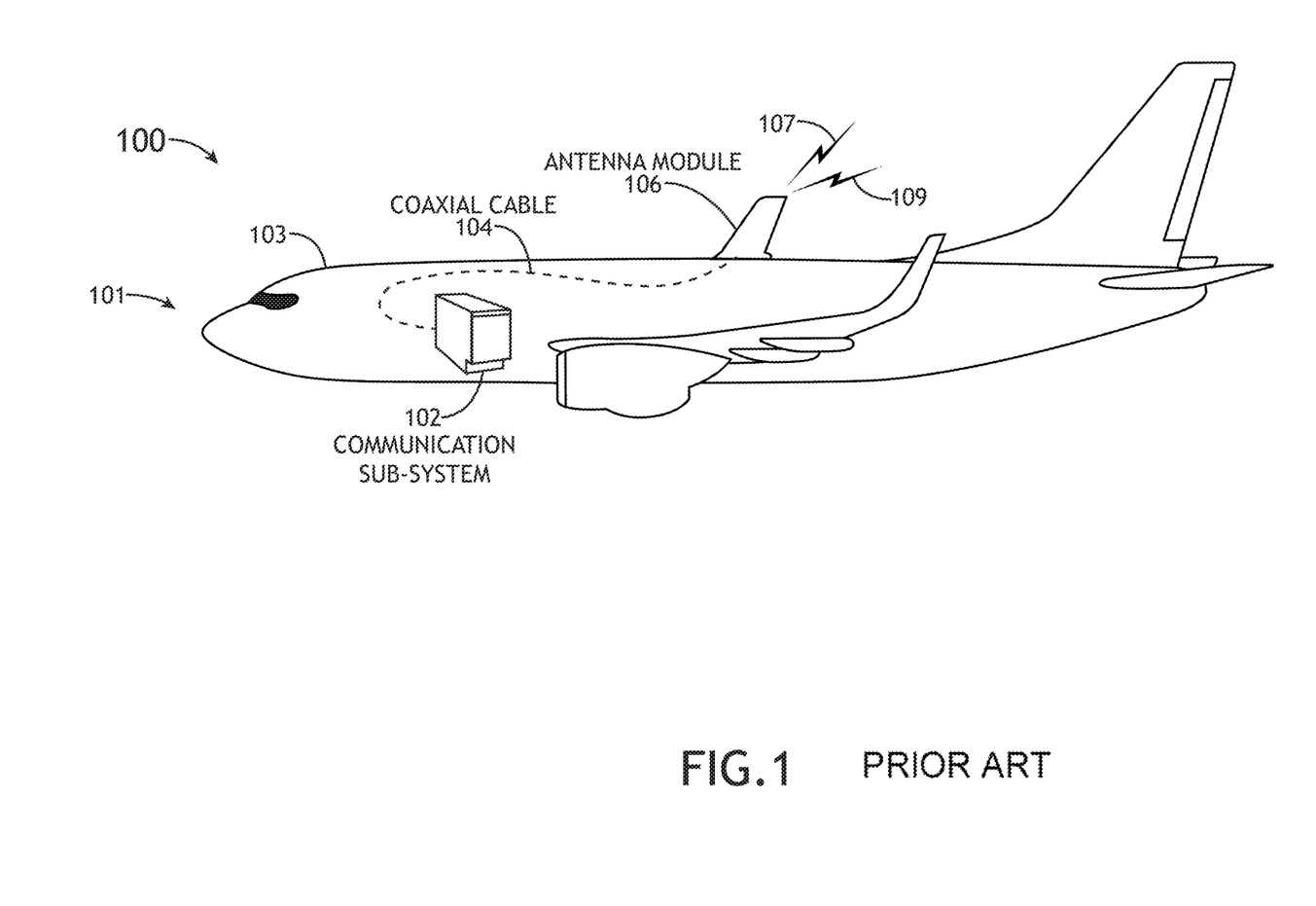
FIG. 1 illustrates an aircraft antenna system.

FIG. 1 illustrates an aircraft antenna system 100. In particular, aircraft antenna system 100 provides an example of a traditional aircraft antenna system. It is contemplated herein that a brief description of the aircraft antenna system 100 may provide a reference point against which attendant advantages of the present disclosure may be compared.

The aircraft antenna system 100 may include a communication sub-system 102, a coaxial cable 104, and a plurality of antenna modules 106. The communication sub-system 102 may be disposed within an avionics bay of an aircraft 101. For example, the aircraft antenna system 100 may include a radio line-replaceable unit (LRU) disposed within a pressure vessel 103 (e.g., within the cabin) of the aircraft 101. The communication sub-system 102 may be configured to house electronics components configured to enable the digital and RF functions of antenna modules 106. Generally, the communication sub-system delivers only RF signal to the antenna modules 106.

The one or more antenna modules 106 may be communicatively coupled to the communication sub-system 102 via a single radio frequency (RF) coaxial cable 104. The one or more antenna modules 106 may be disposed exterior to an aircraft pressure vessel 103, and may include passive antennas disposed on an exterior surface of the aircraft 101. In this regard, the one or more antenna modules 106 may be configured to transmit one or more signals 107, and receive one or more signals 109 from one or more transmitting devices (e.g., satellites, radios, other aircraft, terrestrial towers, and the like).

Figure 2:
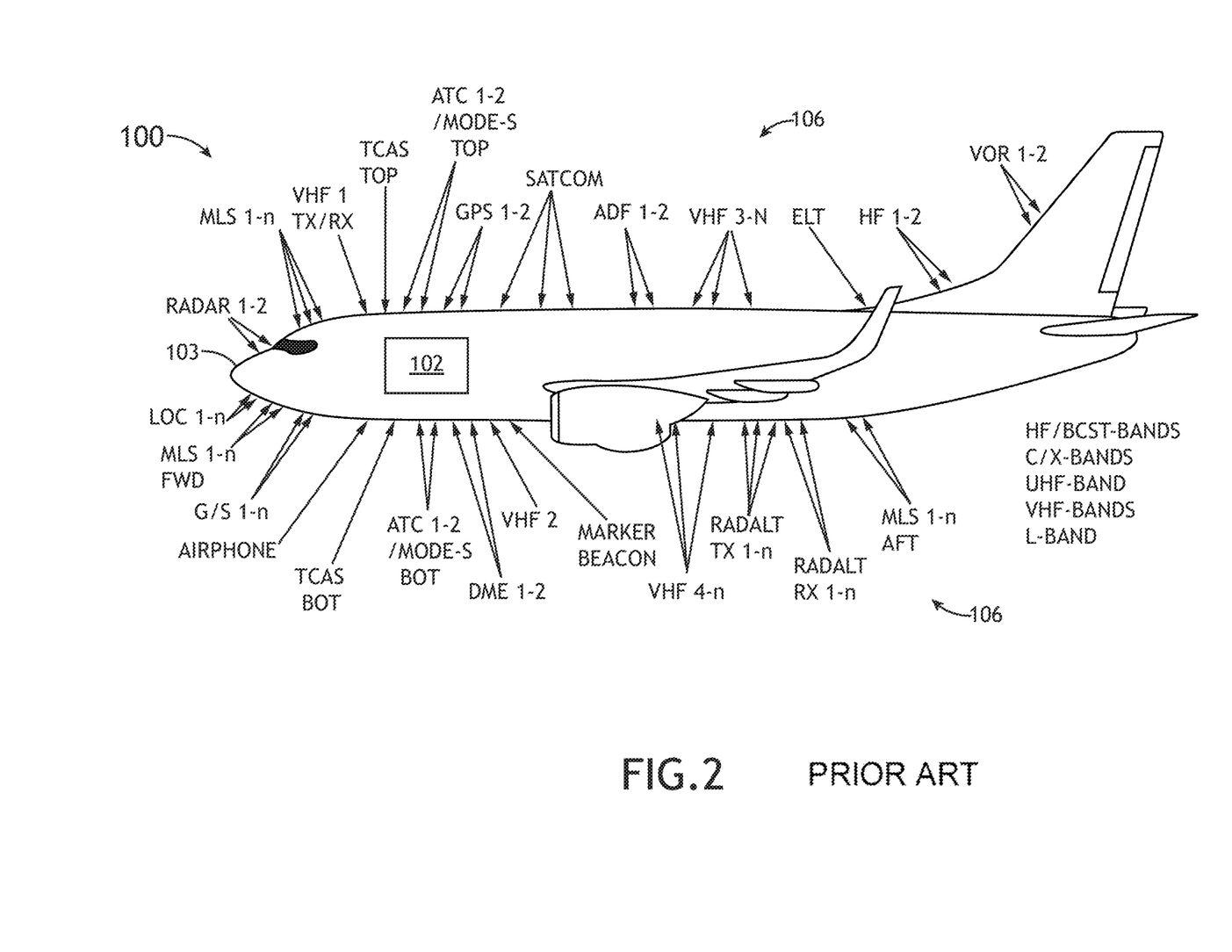
FIG. 2 illustrates an aircraft antenna system including a plurality of antenna modules disposed on an exterior surface of an aircraft.

As noted previously herein, even an average aircraft 101 may include a multitude of antenna modules 106 disposed on the aircraft 101. For example, FIG. 2 illustrates an aircraft antenna system 100 including a plurality of antenna modules 106 disposed on an exterior surface of an aircraft. In particular, FIG. 2 illustrates an average commercial aircraft 101 including a vast number of antenna modules 106 configured to carry out a multitude of different functions, including communication functions, navigation functions, and surveillance functions. Due to the fact that antenna modules 106 must be spaced sufficiently apart to avoid co-site interference, there are very few, if any, remaining mounting locations on an aircraft 101 to mount additional antenna modules 106.

Figure 3:
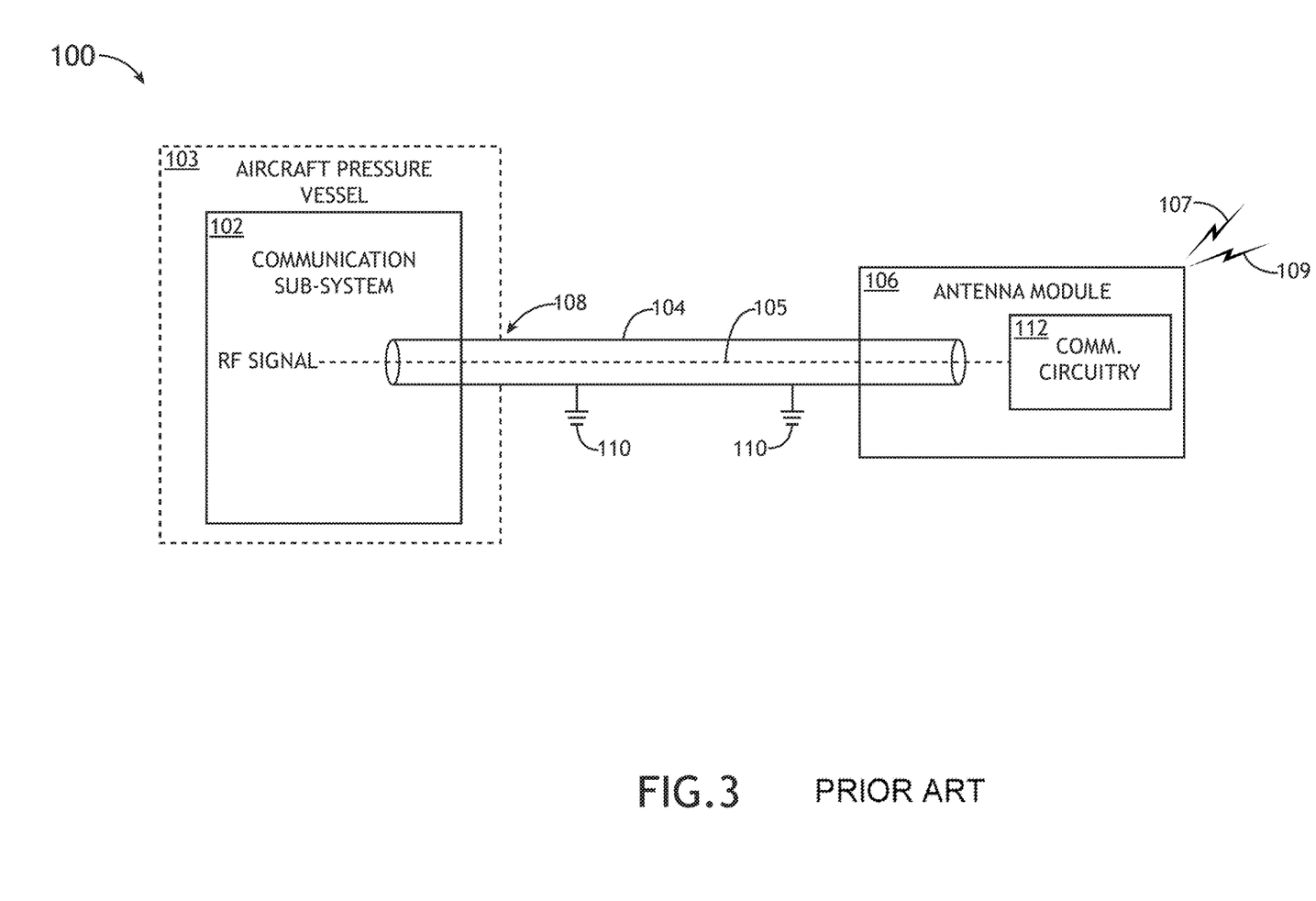
FIG. 3 illustrates a simplified block diagram of an aircraft antenna system.

FIG. 3 illustrates a simplified block diagram of an aircraft antenna system 100. As noted previously herein, the aircraft antenna system 100 may include a communication sub-system 102, a coaxial cable 104, and an antenna module 106.

The communication system 102 may be disposed within an aircraft pressure vessel 103 of an aircraft 101. The communication sub-system 102 (e.g., radio LRU) may be configured to generate an RF signal 105, and transmit the RF signal 105 through the coaxial cable 104 to the antenna module 106. Due to the fact that antenna modules 106 are typically disposed exterior to the pressure vessel 103 of the aircraft 101, the coaxial cable 104 may be routed from the communication sub-system 102 to the antenna module 106 through a port 108 disposed in the exterior surface of the pressure vessel 103. The coaxial cable 104 may be coupled to electrical ground 110.

Conventionally, antenna modules 106 of an aircraft antenna system 100 include passive antennas. In this regard, the antenna module 106 of the aircraft antenna system 100 may include communication circuitry 112 associated with a passive antenna. The communication circuitry 112 may be configured to transmit signals 107 and/or receive signals 109. For example, the communication circuitry 112 of the passive antenna module 106 may be configured to receive the RF signal 105 from the communication sub-system 102 via coaxial cable 104, and transmit one or more signals 107 in response to the RF signal 105. Additionally and/or alternatively, the communication circuitry 112 of the passive antenna module 106 may be configured to receive one or more signals 109 from one or more transmitting devices, and transmit an RF signal 105 to the communication sub-system 102 via coaxial cable 104.

Compared to passive antenna modules 106 which only require an RF signal 105 for operation, modern multifunctional antennas and digital antennas may be configured to carry out a plurality of functions within a single radio and/or antenna system. In particular, modern multifunctional/digital antenna modules may enable numerous communication, navigation, and/or surveillance functions within a single antenna system. For example, digital arrays (e.g., digital antenna modules, AESAs) may enable additional functionality including, but not limited to, multiple/simultaneous beams, directional beamforming, adaptive and/or automatic nulling (e.g., nullforming for interfering signals), direction finding, and the like.

However, in order to enable new functionality, digital arrays (e.g., digital antenna modules) typically require a power supply, reference clock signal, and high-speed data signals (e.g., high-speed transmission signal). These signals are traditionally transmitted from a communication sub-system to the digital arrays via multiple interfaces (e.g., multiple wires). However, as shown in FIG. 3, a traditional coaxial cable 104 of a traditional antenna system 100 transmits only an RF signal 105 without a power supply or additional signals (e.g., reference clock signals). Additionally, rewiring (e.g., retrofitting) current aircraft 101 to replace coaxial cables 104 with multiple cables/interfaces (e.g., multiple copper cables, multiple fiber optic cables) to enable the transmission of a power supply, a reference clock signal, and high-speed data signals may be extremely labor intensive and expensive. Furthermore, replacing coaxial cable 104 with a plurality of cables/interfaces to enable digital antenna modules would require taking aircraft 101 out of service for an extended period of time, resulting in lost profits.

Accordingly, embodiments of the present disclosure are directed to a system and method which cure one or more of the shortfalls of previous approaches identified above.

Figure 4A:
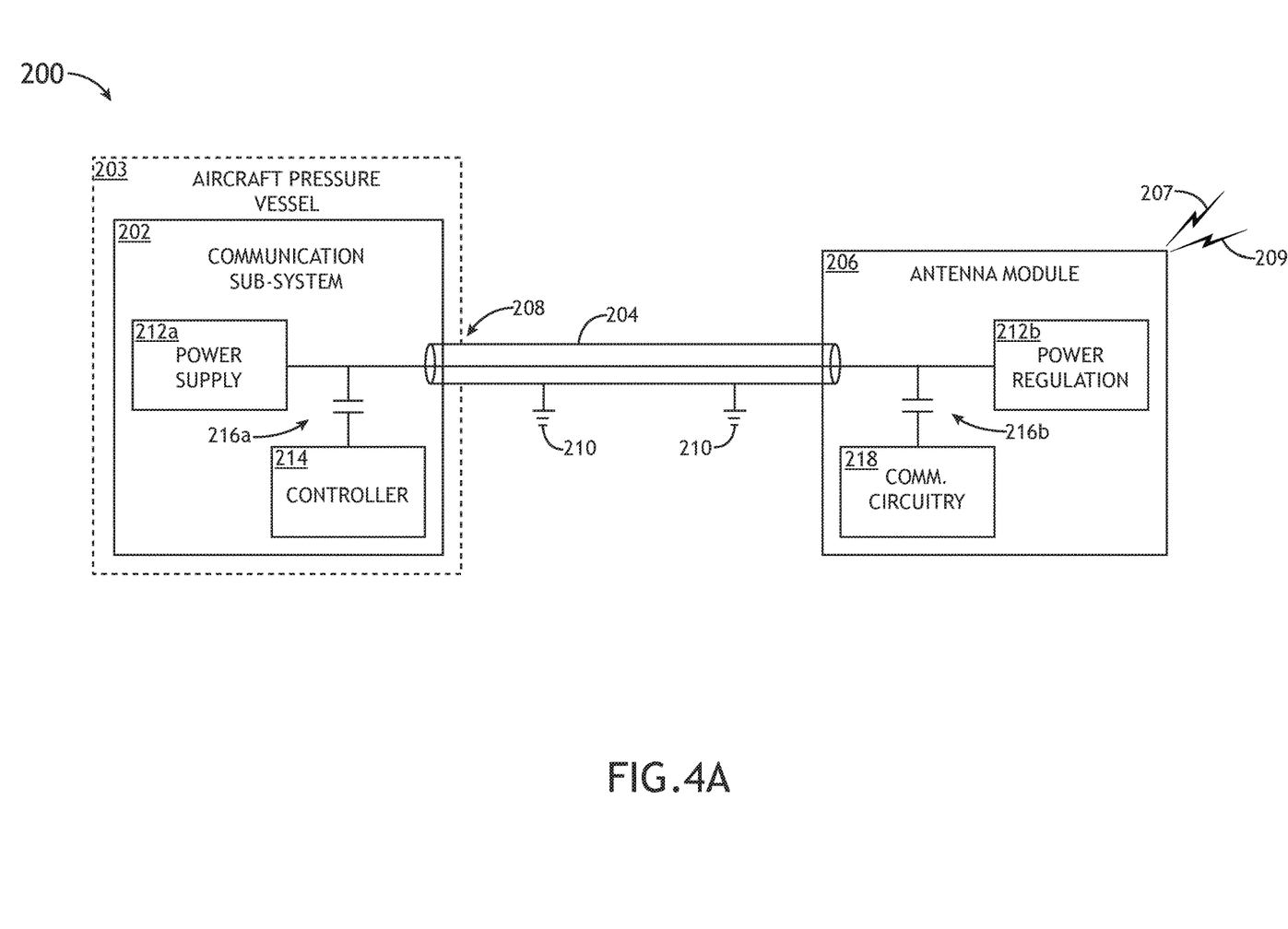
FIG. 4A illustrates a simplified block diagram of an aircraft antenna system, in accordance with one or more embodiments of the present disclosure.

FIG. 4A illustrates a simplified block diagram of an aircraft antenna system 200, in accordance with one or more embodiments of the present disclosure. The aircraft antenna system 200 may include, but is not limited to, a communication sub-system 202, an electrical line 204, and an antenna module 206.

Although example embodiments of the present disclosure are shown and described in an aircraft environment, the inventive concepts of the present disclosure may be configured to operate in alternative and/or additional contexts, unless noted otherwise herein. For example, the embodiments of the present disclosure may be incorporated into the any air, land, or water-based vehicle (e.g., aircraft, automobiles, boats, ships, military vehicles, space vehicles, satellites), residential structures, commercial buildings, and the like. Thus, references to "aircraft," "airplanes," "avionics," and like terms should not be interpreted as a limitation on the present disclosure, unless noted otherwise herein.

It is further noted herein that, where the environment includes an aircraft environment, it is noted herein the embodiments of antenna system 200 may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

In embodiments, the communication sub-system 202 may be disposed within a pressure vessel 203 of an aircraft (as shown in FIG. 1). For example, the communication sub-system 202 may be disposed within an avionics bay or cabin of an aircraft. The communication sub-system 202 may include any device or group of electronic components which are configured to support operation of the antenna module 206. In this regard, the communication sub-system 202 may include any device configured to carry out steps/functions for communication, navigation, or surveillance functions of an aircraft. For example, the communication sub-system 202 may include a radio LRU.

The communication sub-system 202 may include, but is not limited to, one or more power supply components 212a, a controller 214, and a capacitive coupling device 216a. In embodiments, the one or more power supply components 212a are configured to generate a direct current (DC) power supply, which may be provided to the antenna module 206 in order to power various components of the antenna module 206. The one or more power supply components 212a may include any power supply components known in the art including, but not limited to, a battery, a generator, components electrically coupled to a power source, and the like.

In embodiments, the controller 214 may include one or more processors and a memory. The one or more processors of the controller 214 may be configured to execute a set of program instructions stored in memory, wherein the set of program instructions are configured to cause the one or more processors to carry out various steps/functions of the present disclosure. In particular, the controller 214 may be configured to carry out processing functionality to enable efficient and commanded control of the antenna module 206.

For example, the controller 214 may be configured to carry out processing functionality in order to generate transmit signals which will cause the antenna module 206 to transmit transmission signals 207 with particular characteristics. In this regard, the controller 214 may be configured to generate one or more signals configured to selectively adjust one or more characteristics of the antenna module 206 (e.g., on/off status of antenna module 206, direction of transmission signals 207, power of transmission signals 207, beamforming/nulling of antenna module 206). By way of another example, the controller 214 may be configured to carry out processing functionality in order to generate signals which will cause the antenna module 206 to receive reception signals 209 and interpret/process data contained within reception signals 209.

As will be discussed in further detail herein, the capacitive coupling device 216a may include any capacitive coupling device/assembly known in the art. In this regard, the capacitive coupling device 216a may include any alternating current (AC) coupling device/assembly. For example, the capacitive coupling device 216a may include, but is not limited to, one or more capacitors. In embodiments, the capacitive coupling device 216a may be configured to capacitively couple (e.g., AC couple) one or more outputs of the controller 214 to a DC power supply generated by the power supply components 212a. Taken together, DC power supply and the signal outputs of the controller 214 capacitively coupled to the DC power supply via the capacitive coupling device 216a may form an antenna input signal.

It is noted herein that performing AC coupling (capacitive coupling) with the capacitive coupling device 216a may enable the transmission of additional interfaces for modern, digitally-enabled antennas (e.g., digital antenna module) over existing RF coaxial cables (e.g., electrical line 204). By coupling various AC signals (e.g., clock signals, control signals, transmission signals) to the DC power supply, antenna system 200 of the present disclosure may eliminate the need to retrofit (rewire) aircraft with pre-existing coaxial cables 104 and antenna mounting sites.

In embodiments, the electrical line 204 may be configured to transmit the antenna input signal from the communication sub-system 202 to the antenna module 206. The electrical line 204 may be coupled to electrical ground 210. It is contemplated herein that the electrical line 204 may include any device known in the art for transmitting electrical signals and a power supply including, but not limited to, wires, cables, vias, and the like. For example, in some embodiments, the electrical line 204 may include a coaxial cable. By way of another example, the electrical line 204 may include a twisted-pair cable. Generally speaking, the electrical line 204 may include any impedance-controlled signal transmission device.

In some embodiments, the electrical line 204 may be routed from the communication sub-system 202 to the antenna module 206 through one or more ports 208 disposed in an exterior surface of the pressure vessel 203 of the aircraft. Where the antenna system 200 is implemented in contexts other than an aircraft, the electrical line 204 may be routed from the communication sub-system 202 to the antenna module 206 through one or more ports 208 disposed in an exterior surface of the building, terrestrial vehicle (e.g., car, bus, train), aquatic vehicle (e.g., boat, ship), and the like.

In embodiments, the antenna module 206 may include, but is not limited to, one or more power regulation components 212b, communication circuitry 218, and a capacitive coupling device 216b. In embodiments, the one or more power regulation components 212b are configured to receive a direct current (DC) power supply from the one or more power supply components 212a of the communication sub-system 202. The one or more power regulation components 212b may be coupled to the various other components of the antenna module 206 (e.g., communication circuitry 218, capacitive coupling device 216b) in order to provide and/or regulate power required for the antenna module 206. In this regard, the one or more power regulation components 212b may include any power supply components known in the art including, but not limited to, a battery.

The capacitive coupling device 216b may include any capacitive coupling device/assembly. In this regard, the capacitive coupling device 216b may include any alternating current (AC) coupling device/assembly. For example, the capacitive coupling device 216b may include, but is not limited to, one or more capacitors. In embodiments, the capacitive coupling device 216b may be configured to capacitively de-couple the one or more outputs of the controller 214 from the DC power supply generated by the power supply components 212a. For example, the capacitive coupling device 216b may include a DC-blocking capacitor configured to filter out DC signals in order to separate the signals/outputs of the controller 214 from the DC power supply. For the purpose of clarity, the capacitive coupling device 216a of the communication sub-system 202 may be referred to as a "first" capacitive coupling device 216a of the antenna system 200, whereas the capacitive coupling device 216b of the antenna module 206 may be referred to as a "second" capacitive coupling device 216b of the antenna system 200.

In embodiments, the communication circuitry 218 of the antenna module 206 is configured to transmit one or more transmission signals 207 and/or receive one or more reception signals 209. In this regard, the communication circuitry 218 may include any analog communication circuitry and/or digital communication circuitry configured to enable transmitting, receiving, and/or transceiving capabilities of the antenna module 206. For example, the communication circuitry 218 may include, but is not limited to, an antenna array including a plurality of antenna elements (e.g., active electrically scanned array (AESA)), analog-to-digital converter (ADC) devices, filters, amplifiers, phase shifters, and the like. In embodiments, the communication circuitry 218 is configured to receive one or more signals/outputs of the controller 214 and transmit one or more transmission signals 207 based on the received signals/outputs.

In additional and/or alternative embodiments, the communication circuitry 218 is configured to receive one or more reception signals 209 from one or more transmitting devices, and transmit signals responsive to the received reception signals 209 to the communication sub-system 202. In embodiments, the communication circuitry 218 may be configured to receive any number of reception signals 209 from any number of transmitting devices in order to carry out communication, navigation, and/or surveillance functions. Furthermore, it is contemplated herein that the communication circuitry 218 may be configured to receive reception signals 209 from any type of transmitting device known in the art including, but not limited to, low Earth orbit (LEO) satellites, geosynchronous equatorial orbit (GEO) satellites, medium Earth orbit (MEO) satellites, radios, terrestrial antennas, and the like.

The various components and steps/functions of the antenna system 200 may be further shown and described with reference to FIG. 4B.

Figure 4B:
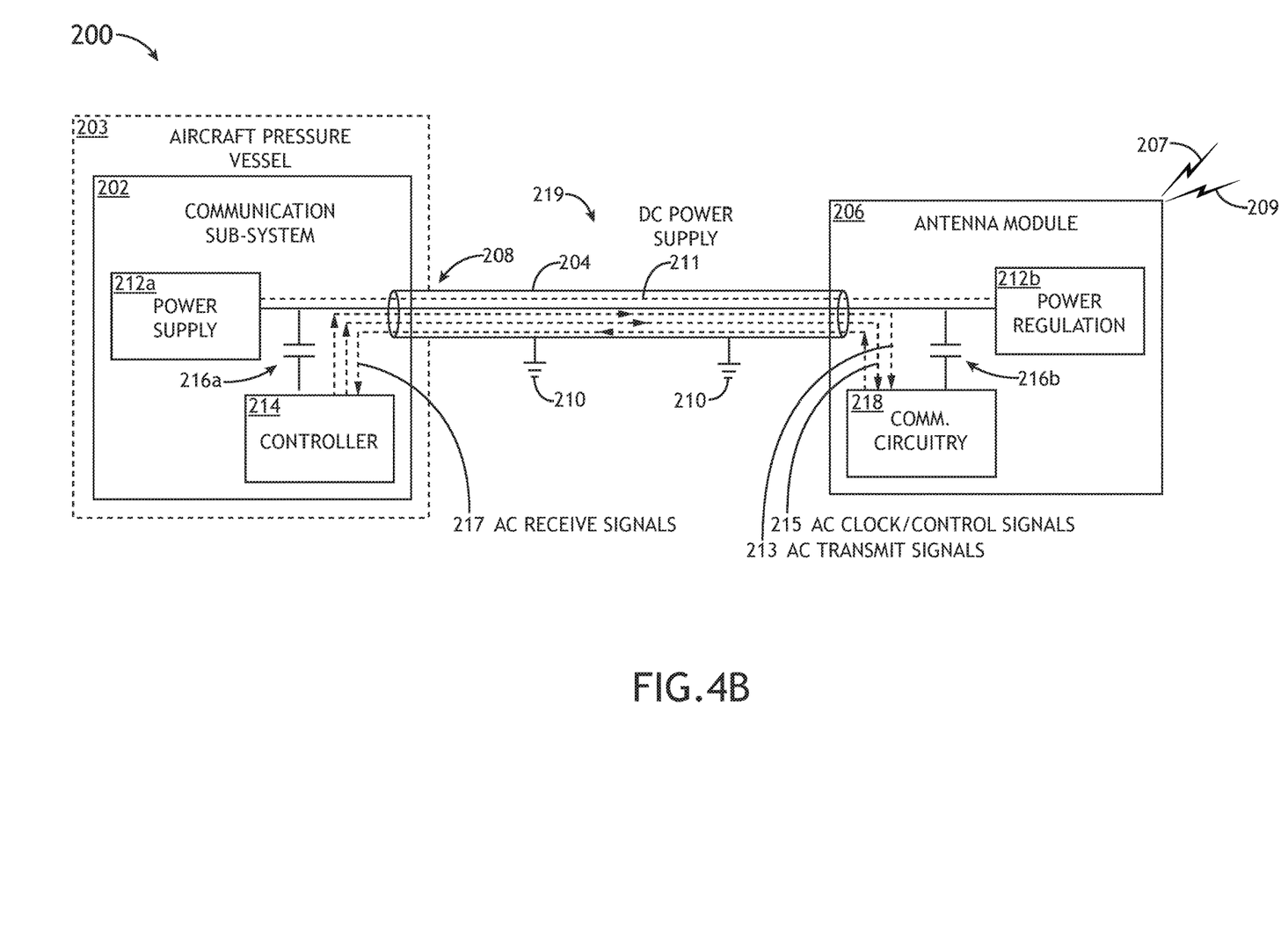
FIG. 4B illustrates a simplified block diagram of an aircraft antenna system, in accordance with one or more embodiments of the present disclosure.

FIG. 4B illustrates a simplified block diagram of the aircraft antenna system 200, in accordance with one or more embodiments of the present disclosure. It is noted herein that any discussion regarding the aircraft antenna system 200 illustrated in FIG. 4A may be regarded as applying to the aircraft antenna system 200 illustrated in FIG. 4B, unless noted otherwise herein. Conversely, it is noted herein that any discussion regarding the aircraft antenna system 200 illustrated in FIG. 4B may be regarded as applying to the aircraft antenna system 200 illustrated in FIG. 4A, unless noted otherwise herein.

As noted previously herein, modern antenna modules (e.g., digital antenna modules 206, multifunction antenna modules 206) may require a number of inputs in order to function properly. For example, in the context of a digital antenna module (e.g., digital antenna module 206), the digital antenna module 206 may require a power supply, as clock signal, and a transmit signal (e.g., digital data signal and/or control signals). Compared to a passive antenna module 106 illustrated in FIG. 3, a digital antenna module 206 may require additional inputs to be transmitted over an electrical line 204. Accordingly, embodiments of the present disclosure are directed to an antenna system 200 for transmitting multiple inputs required for a digital/multifunctional antenna module 206 over a single electrical line 204.

In embodiments where the antenna module 206 requires power to function, the one or more power supply components 212a of the communication sub-system 202 may be configured to generate a direct current (DC) power supply 211. For example, the one or more power supply components 212a may be configured to generate a DC power supply 211 of 28 VDC. In embodiments, the DC power supply 211 may be transmitted/provided to the one or more power regulation components 212b of the antenna module 206 via the electrical line 204. For example, in embodiments where the electrical line 204 includes a coaxial cable, the DC power supply 211 may be transmitted from the communication sub-system 202 to the antenna module 206 through a center conductor of the coaxial cable (electrical line 204).

In some embodiments, the controller 214 may be configured to generate one or more alternating current (AC) transmit signals 213. The one or more AC transmit signals 213 may include digital signals (e.g., digital AC transmit signals 213) and/or analog signals (e.g., analog AC transmit signals 213). In some embodiments, the controller 214 may be configured to generate the AC transmit signals 213 by modulating an RF carrier with one or more modulation operations. It is noted herein that the one or more AC transmit signals 213 may be formed using any modulation techniques known in the art including, but not limited to, orthogonal frequency-division multiplexing (OFDM) techniques, digital/binary modulation techniques, minimum-shift keying (MSK), phase-shift keying (e.g., binary phase-shift keying (BPSK), quadrature phase-shift keying (QPSK)), amplitude-shift keying (ASK), decision feedback differential modulation (DFDM), and the like. Additionally, it is contemplated herein that varying RF carrier frequencies may be used to generate and/or receive multiple signals.

It is further noted herein that the term "AC transmit signals 213" may be used to refer to signals generated by the controller 214 which will control various characteristics of transmission signals 207 transmitted by the communication circuitry 218 of the antenna module 206. Characteristics which may be selectively controlled by the antenna module 206 may include, but are not limited to, direction of transmission signals 207, power of transmission signals 207, and the like.

For example, in the context of a digital antenna module 206 in which the communication circuitry 218 includes an antenna array of one or more antenna elements, the AC transmit signal 213 generated by the controller 214 may be configured to cause the antenna array (communication circuitry 218) to steer one or more beams in designated directions, and with selected power levels.

In embodiments, the capacitive coupling device 216a of the communication sub-system 202 (e.g., radio LRU) may be configured to perform capacitive/AC coupling in order to capacitively couple the AC transmit signal 213 to the DC power supply 211. For example, the controller 214 may be configured to generate a digital AC transmit signal 213 including digital data, and the capacitive coupling device 216a may be configured to capacitively couple the digital AC transmit signal 213 to the DC power supply 211. In this regard, the digital AC transmit signal 213 may ride "on top of" the DC power supply 211. The analog and/or digital signals (e.g., digital AC transmit signal 213) may be coupled to the DC power supply 211 using any AC/capacitive coupling techniques known in the art.

In embodiments, the DC power supply 211 and AC transmit signal 213 coupled to the DC power supply 211 may be transmitted from the communication sub-system 202 to the antenna module 206 via the electrical line 204. It is noted herein that the output of the communication sub-system 202 which is transmitted to the antenna module 206 may be referred to as an "antenna input signal 219." In this regard, the antenna input signal 219 may include any power supply and/or signals transmitted from the communication sub-system 202 through the electrical line 204 to the antenna module 206. For example, where the capacitive coupling device 216a is configured to couple only the AC transmit signal 213 to the DC power supply 211, the antenna input signal 219 may include the DC power supply 211 and the AC transmit signal 213.

In embodiments, as noted previously herein, the one or more power regulation components 212b of the antenna module 206 may be configured to receive the DC power supply 211 of the antenna input signal 219, and power the various components of the antenna module 206 with the DC power supply 211.

In additional embodiments, the capacitive coupling device 216b of the antenna module 206 may be configured to receive the antenna input signal 219 and de-couple the various AC signals coupled to the DC power supply 211. In this regard, the second capacitive coupling device 216b may be configured to block or filter-out any DC voltage attributable to the DC power supply 211 in order to separate AC signals from the DC power supply 211. For example, in embodiments where the antenna input signal 219 includes only the DC power supply 211 and the AC transmit signal 213 coupled to the DC power supply 211, the capacitive coupling device 216b may be configured to de-couple the DC power supply 211 and the AC transmit signal 213.

Following de-coupling with the capacitive coupling device 216b, de-coupled AC signals may be directed to the communication circuitry 218. For example, the AC transmit signal 213 (de-coupled from the DC power supply 211) may be directed to the communication circuitry 218. In embodiments, the communication circuitry 218 may be configured to receive the AC transmit signal 213, and generate one or more transmission signals 207 based on the received AC transmit signal 213.

As noted previously herein, the communication circuitry 218 may include any signal transceiving and/or processing components known in the art including, but not limited to, an antenna array including a plurality of antenna elements (e.g., active electrically scanned array (AESA)), analog-to-digital converter (ADC) devices, filters, amplifiers, and the like. In this regard, the communication circuitry 218 may be configured to perform one or more signal processing operations on the received AC transmit signal 213 in order to generate the one or more transmission signals 207. For example, the antenna module 206 and/or communication circuitry 218 may include an analog-to-digital converter (ADC) device configured to receive a digital AC transmit signal 213 and generate an analog AC transmit signal 213. In this example, the communication circuitry 218 may then be configured to generate the one or more transmission signals 207 based on the analog AC transmit signal 213.

It is noted herein that it may be desirable to perform some signal-processing operations at the antenna module 206, rather than performing all of the signal-processing operations at the communication sub-system 202. For example, performing some signal processing operations on received signals 209 at the antenna module 206 may enable improved efficiency, sensitivity, and performance of the antenna module 206. [Decrease loss]. In embodiments where signal processing operations are carried out within the antenna module 206, the antenna module 206 and/or communication circuitry 218 may include one or more processors or processing devices (e.g., micro-controllers, circuitry, field programmable gate arrays (FPGA), and the like).

In order to enable signal processing operations to be performed within the antenna module 206, the antenna module 206 may require one or more additional AC signals in addition to, and on top of, the DC power supply 211 and the AC transmit signal 213. For example, in embodiments where the antenna module 206 is to be synchronized with additional antenna modules 206, the communication circuitry 218 and/or processing components of the antenna module 206 may require an AC clock signal 215 including clock synchronization data.

In this regard, the controller 214 of the communication sub-system 202 (e.g., radio LRU) may be configured to generate one or more additional AC signals 215, wherein the capacitive coupling device is configured to couple the one or more additional AC signals 215 and/or the AC transmit signal 213 to the DC power supply 211. In embodiments where the capacitive coupling device 216a capacitively couples the AC transmit signal 213 and one or more additional AC signals 215 to the DC power supply 211, the antenna input signal 219 may include the DC power supply 211, the AC transmit signal 213, and the one or more additional AC signals 215.

The one or more additional AC signals 215 coupled to the DC power supply 211 may include any signals known in the art desired to be transmitted to the antenna module 206. For example, as noted previously herein, the one or more additional AC signals 215 may include an AC clock signal 215 including clock synchronization data. In this example, the antenna module 206 (e.g., processing components of the antenna module 206) may utilize the AC clock signal 215 to synchronize an internal clock of the antenna module 206 to the communication sub-system 202 and/or one or more other antenna modules 206a-206n.

By way of another example, the one or more additional AC signals 215 may include an AC control signal 215. In this example, the AC control signal 215 may include one or more control commands configured to selectively adjust one or more characteristics of the antenna module 206. For instance, the AC control signal 215 may include control commands configured to selectively adjust a signal-steering characteristic, a transmission power of the antenna module 206, or the like.

In additional and/or alternative embodiments, the antenna module 206 may be configured to transmit one or more signals to the communication sub-system 202, via the electrical line 204, by capacitively coupling one or more AC signals to the DC power supply 211.

For example, the communication circuitry 218 may be configured to receive one or more reception signals 209 from one or more transmitting devices. The communication circuitry 218 may then be configured to generate one or more AC receive signals 217 in response to, or based on, the reception signals 209. For instance, the communication circuitry 218 may be configured to perform one or more signal processing operations (e.g., amplifying, filtering, beamforming, and the like) on the one or more reception signals 209 in order to generate the one or more AC receive signals 217.

Continuing with the same example, the capacitive coupling device 216b may be configured to capacitively couple the one or more AC receive signals 217 to the DC power supply 211, wherein the electrical line 204 is then configured to transmit the one or more AC receive signals 217 from the antenna module 206 to the communication sub-system 202. Upon arriving at the communication sub-system 202, the controller 214 may be configured to receive the AC receive signals 217, perform one or more signal processing operations, and/or generate one or more control signals in response to the received AC receive signals 217.

The communication circuitry 218 and/or processing elements of the antenna module 206 may be further configured to generate one or more additional AC signals to be transmitted from the antenna module 206 back to the communication sub-system 202. For example, the communication circuitry 218 of the antenna module may be further configured to generate one or more AC feedback signals (not shown), and transmit the one or more AC feedback signals to the communication sub-system 202 via the second capacitive coupling device 216b and the electrical line 204. In this regard, the second capacitive coupling device 216b may be configured to capacitively couple the one or more AC feedback signals to the DC power supply 211, and transmit the AC feedback signals to the communication sub-system 202 via the electrical line 204.

The one or more AC feedback signals may include any analog or digital signals known in the art desired to be transmitted from the antenna module 206 to the communication sub-system 202. Accordingly, the AC feedback signals may include data associated with any characteristic of the antenna module 206 known in the art including, but not limited to, an operational status of the antenna module 206 (e.g., on, off), health status of the antenna module 206, an operating voltage/current of the antenna module 206, temperature values, pressure values, transmitting power values, and the like. For example, an AC feedback signal generated by the antenna module 206 may include an antenna module 206 status signal including data associated with an operational status of the antenna module 206.

It is contemplated herein that the ability to transmit AC feedback signals (e.g., antenna module 206 status signals) from the antenna module 206 to the communication sub-system 202 may provide for improved data transfer throughout the antenna system 200, thereby leading to improved transparency. Furthermore, AC feedback signals may provide for improved safety of the antenna system 200.

For example, in embodiments where the electrical line 204 includes a coaxial cable, there is a danger that the coaxial cable may transmit a dangerously high current to the antenna module 206, which may potentially short circuit and damage components of the antenna system 200. Similarly, an incorrect antenna input signal 219 may be transmitted within antenna system 200 if an incorrect antenna module 206 is connected to the electrical line 204. In the event the antenna module 206 receives an incorrect and/or dangerous antenna input signal 219, the communication circuitry 218 may be configured to transmit an AC feedback signal to the communication sub-system 202, wherein the AC feedback signal includes data indicating the incorrect and/or dangerous antenna input signal 219. In this example, the controller 214 may receive the AC feedback signal and terminate power and/or the antenna input signal 219 to the antenna module 206 in order to terminate the incorrect and/or dangerous condition.

When two or more AC signals (e.g., AC transmit signal 213, AC clock signal 215, AC control signal 215, AC receive signal 217, AC feedback signal (not shown)) are capacitively coupled to the DC power supply 211, each of the respective AC signals may be coupled to the DC power supply 211 at a unique frequency. This may be further understood with reference to FIG. 5.

Figure 5:
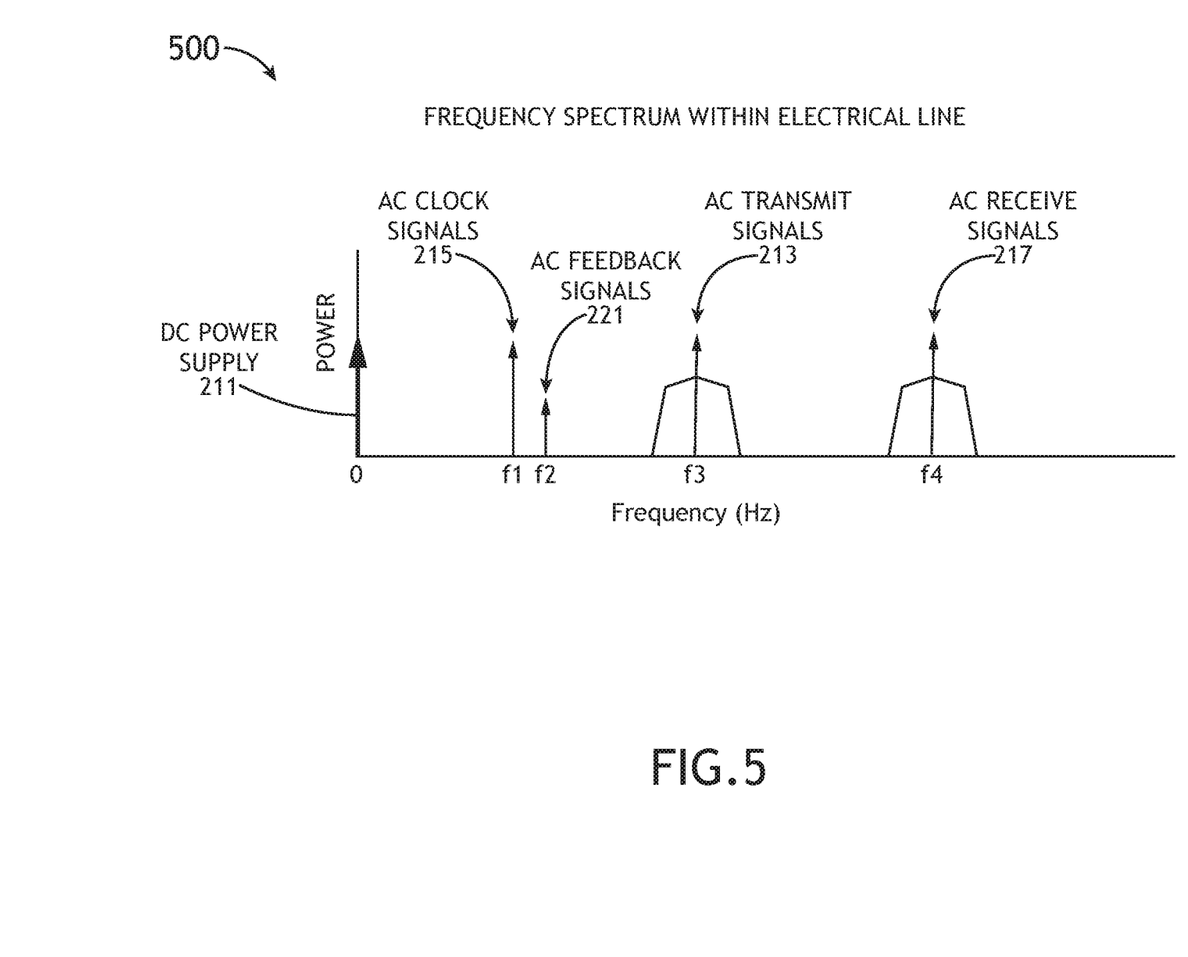
FIG. 5 is a graph illustrating frequency spectrum within an electrical line of an aircraft antenna system, in accordance with one or more embodiments of the present disclosure.

FIG. 5 is a graph 500 illustrating frequency spectrum within an electrical line 204 of an aircraft antenna system 200, in accordance with one or more embodiments of the present disclosure.

In embodiments, the various DC and/or AC signals transmitted through the electrical line 204 between the communication sub-system 202 and the antenna module 206 may occupy varying frequency ranges. In particular, in embodiments where the antenna input signal 219 includes two or more AC signals (e.g., AC transmit signal 213, AC clock signal 215, AC control signal 215, AC receive signal 217, AC feedback signal), each of the respective AC signals may be transmitted at a unique frequency or frequency range.

For example, as shown FIG. 5, the DC power supply 211 may include a constant voltage, and may therefore exhibit a frequency of 0 Hz. Comparatively, in embodiments where AC clock signals 215, AC feedback signals 221, AC transmit signals 213, and AC receive signals 217 are all coupled to the DC power supply 211 and transmitted through the electrical line 204, each respective AC signal may occupy a different frequency bandwidth. For instance, the AC clock signal 215 may be transmitted at a first frequency ($f_1$) (or first frequency range), and the AC feedback signal 221 may be transmitted at a second ($f_2$) (or second frequency range) different from the first frequency ($f_1$). Similarly, the AC transmit signal 213 may be transmitted at a third frequency range modulated about a third frequency ($f_3$), and the AC receive signal 217 may be transmitted at a fourth frequency range modulated about a fourth frequency ($f_4$).

It is noted herein that coupling and/or transmitting the various AC signals at varying frequencies may facilitate filtering and/or separation of the various signals on the receiving end. This may be further understood with reference to FIGS. 6A-6B.

Figure 6A:
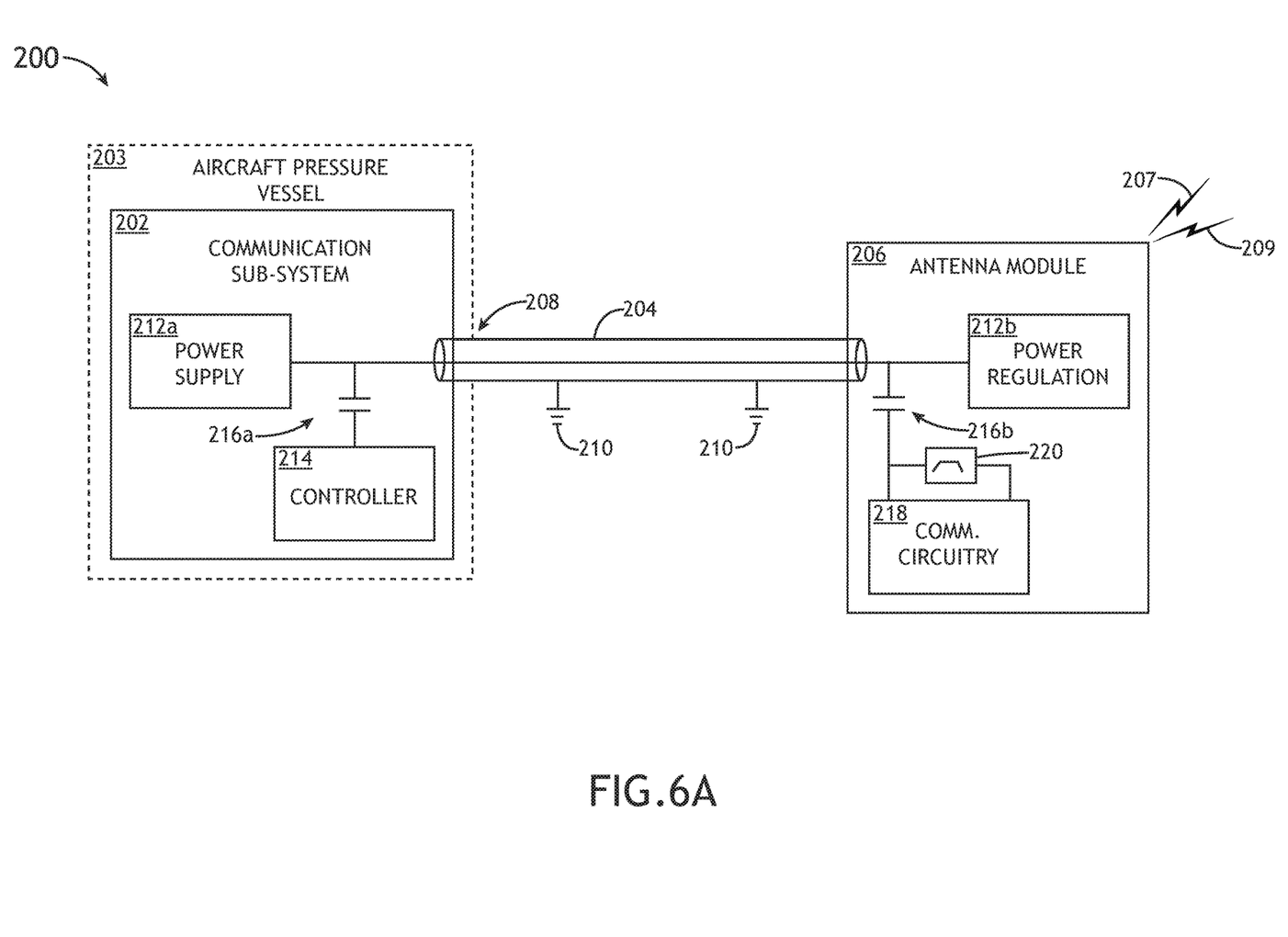
FIG. 6A illustrates a simplified block diagram of an aircraft antenna system, in accordance with one or more embodiments of the present disclosure.
Figure 6B:
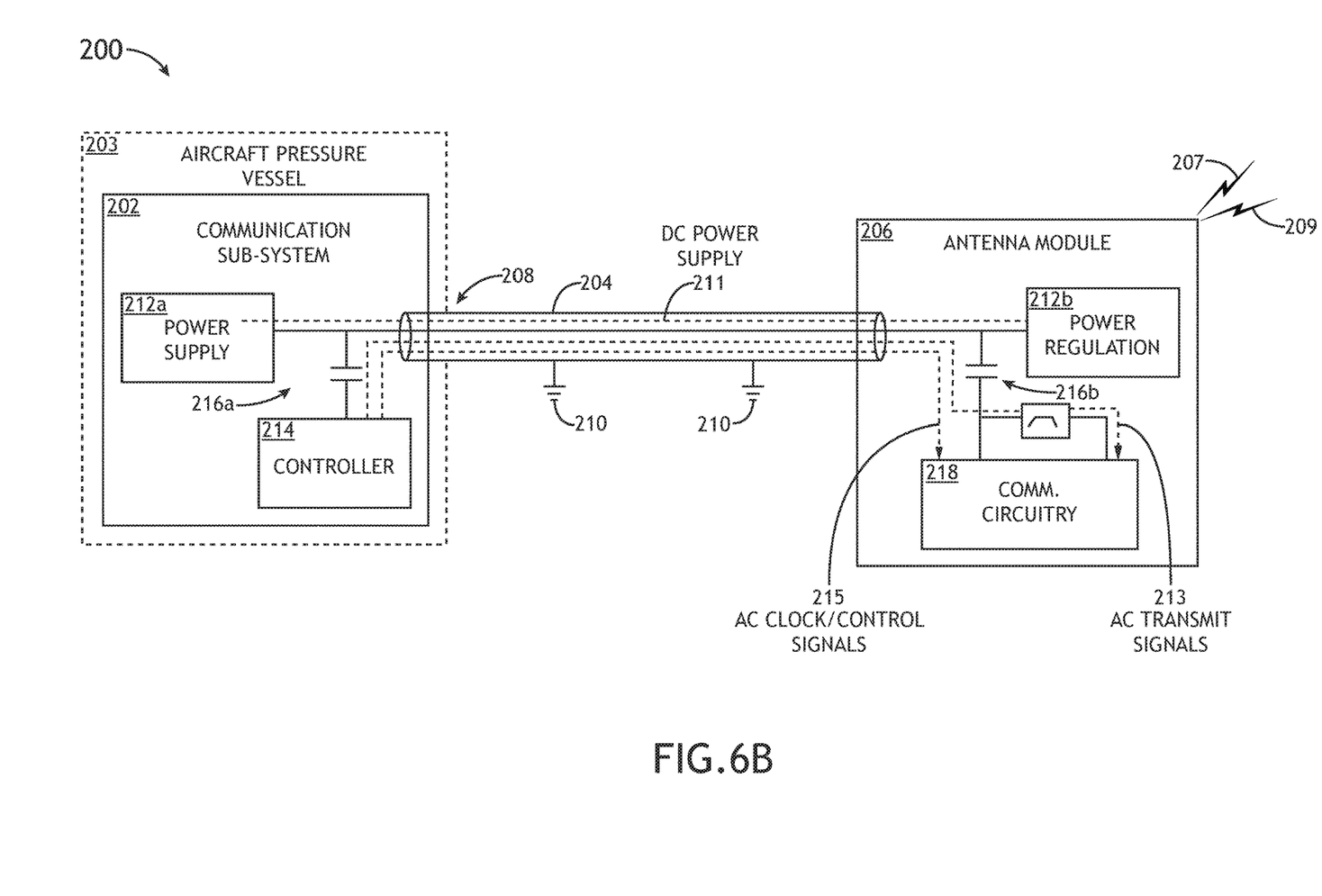
FIG. 6B illustrates a simplified block diagram of an aircraft antenna system, in accordance with one or more embodiments of the present disclosure.

FIGS. 6A-6B illustrate simplified block diagrams of an aircraft antenna system 200, in accordance with one or more embodiments of the present disclosure. It is noted herein that any discussion regarding the aircraft antenna system 200 illustrated in FIGS. 4A-4B may be regarded as applying to the aircraft antenna system 200 illustrated in FIGS. 6A-6B, unless noted otherwise herein. Conversely, it is noted herein that any discussion regarding the aircraft antenna system 200 illustrated in FIGS. 6A-6B may be regarded as applying to the aircraft antenna system 200 illustrated in FIGS. 4A-4B, unless noted otherwise herein.

In some embodiments, the antenna module 206 and/or the communication system 202 may include one or more filters configured to facilitate separation of the various AC signals coupled to, and transmitted with, the DC power supply 211. For example, as shown in FIGS. 6A-6B, the antenna module 206 may include one or more filters 220. The one or more filters 220 may include, but are not limited to, bandpass filters, high-pass filters, low-pass filters, and the like.

In embodiments, the capacitive coupling device 216b is configured to receive the antenna input signal 219 and de-couple the DC power supply 211 and the AC signals. For example, as shown in FIG. 6B, the capacitive coupling device 216b may be configured to receive the antenna input signal 219 including the DC power supply 211, AC transmit signal 213, and AC clock/control signal 215, and block/filter out the DC power supply 211. The one or more filters 220 may then be configured to receive the AC transmit signal 213 and AC clock/control signal 215, and filter out the AC clock/control signals 215 such that only the AC transmit signals 213 are passed through the one or more filters 220. In this regard, the one or more filters 220 may be configured to separate the AC transmit signal 213 from the AC clock/control signals 215 based on the varying transmission frequencies of each respective AC signal.

Continuing with the same example, the communication circuitry 218 may then be configured to receive the AC transmit signals 213 and AC clock/control signals 215, and generate one or more signals 207 based on the AC transmit signals 213 and/or AC clock/control signals 215. For instance, the AC transmit signals 213 may instruct the communication circuitry 218 on the content of the signals 207 to be transmitted, wherein the AC control signal 215 may be configured to selectively control the transmission power and directionality/steering of the transmitted signals 207.

In some embodiments, the antenna module 206 may further include one or more ADC devices configured to convert digital AC signals to analog signals prior to reception at the communication circuitry 218. For example, the antenna module 206 may further include one or more ADC devices configured to receive a digital AC transmit signal 213 from one or more filters 220, and convert the digital AC transmit signal 213 to an analog AC transmit signal 213, which may then be provided to the communication circuitry 218.

Figure 7:
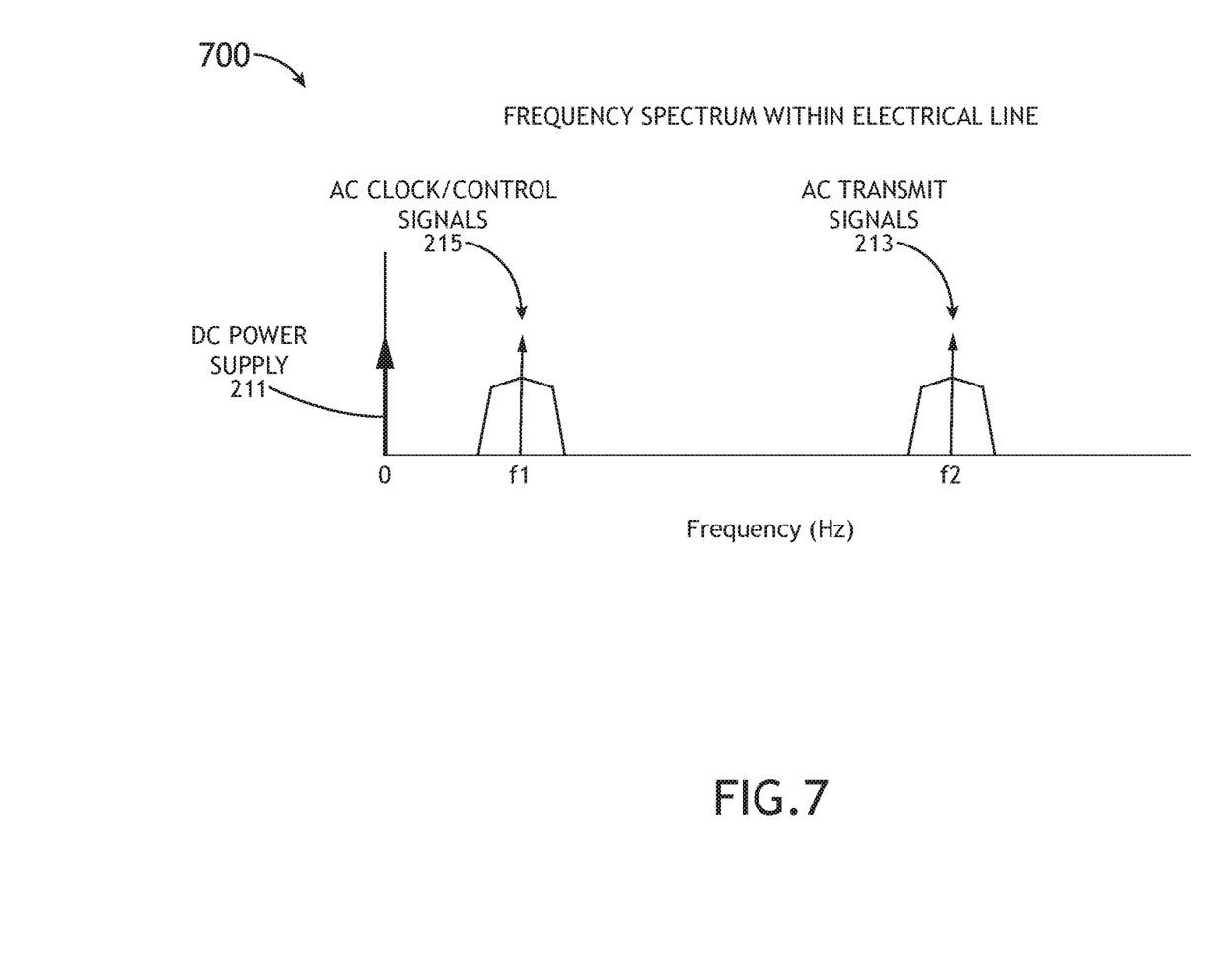
FIG. 7 is a graph illustrating frequency spectrum within an electrical line of an aircraft antenna system, in accordance with one or more embodiments of the present disclosure.

FIG. 7 is a graph 700 illustrating frequency spectrum within an electrical line 204 of an aircraft antenna system 200, in accordance with one or more embodiments of the present disclosure.

As noted previously herein, the various DC and/or AC signals transmitted through the electrical line 204 between the communication sub-system 202 and the antenna module 206 may occupy varying frequency ranges. For example, referring to the aircraft antenna system 200 illustrated in FIG. 6B, the antenna input signal 219 may include the DC power supply 211, the AC transmit signals 213, and the AC clock/control signals 215. In this example, as shown in graph 700, the DC power supply 211 may exhibit a frequency of 0 Hz, the AC clock/control signal 215 may be transmitted at a first frequency range modulated about a first frequency ($f_1$), and the AC transmit signal 213 may be transmitted at a second frequency range modulated about a second frequency ($f_2$).

Figure 8:
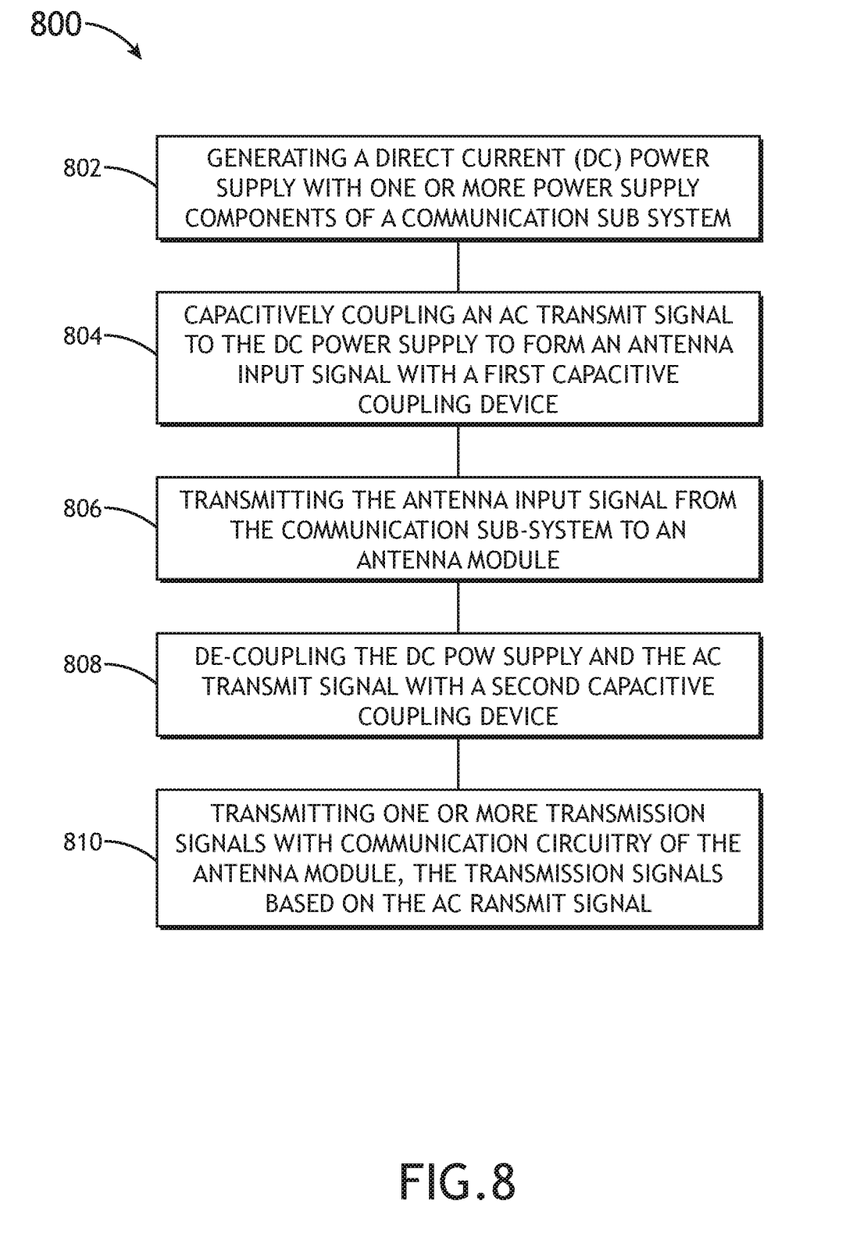
FIG. 8 is a method of operating an antenna system, in accordance with one or more embodiments of the present disclosure.

FIG. 8 is a method 800 of operating an antenna system 200, in accordance with one or more embodiments of the present disclosure. It is noted herein that the steps of method 800 may be implemented all or in part by antenna system 200. It is further recognized, however, that the method 800 is not limited to the antenna system 200 in that additional or alternative system-level embodiments may carry out all or part of the steps of method 800.

In a step 802, a direct current (DC) power supply is generated with one or more power supply components of a communication sub-system. For example, as shown in FIG. 4B, the one or more power supply components 212a of the communication sub-system 202 may be configured to generate a direct current (DC) power supply 211. The one or more power supply components 212a may include any power supply components known in the art including, but not limited to, a battery, a generator, components electrically coupled to a power source, and the like.

In a step 804, AC transmit signal is capacitively coupled to the DC power supply to form an antenna input signal with a first capacitive coupling device. For example, the capacitive coupling device 216a may be configured to capacitively couple (e.g., AC couple) one or more outputs of the controller 214 (e.g., the AC transmit signal 213) to the DC power supply generated by the power supply components 212a. Taken together, DC power supply 211 and the AC transmit signal 213 may form an antenna input signal 219. In additional and/or alternative embodiments, the antenna input signal 219 may further include one or more additional AC signals (e.g., AC clock signal 215, AC control signal 215) capacitively coupled to the DC power supply 211.

In a step 806, the antenna input signal is transmitted from the communication sub-system to an antenna module. For example, the antenna input signal 219 (e.g., DC power supply 211 and AC transmit signal 213) may be transmitted from the communication sub-system 202 to the antenna module 206 via the electrical line 204. It is contemplated herein that the electrical line 204 may include any device known in the art for transmitting electrical signals and a power supply including, but not limited to, wires, cables, vias, and the like. For example, in some embodiments, the electrical line 204 may include a coaxial cable. By way of another example, the electrical line 204 may include a twisted-pair cable.

In a step 808, the DC power supply and the AC transmit signal are de-coupled with a second capacitive coupling device. For example, the capacitive coupling device 216b of the antenna module 206 may be configured to receive the antenna input signal 219 and de-couple the various AC signals coupled to the DC power supply 211. In this regard, the second capacitive coupling device 216b may be configured to block or filter-out any DC voltage attributable to the DC power supply 211 in order to separate the AC transmit signal 213 from the DC power supply 211.

In a step 810, one or more transmission signals are transmitted with communication circuitry of the antenna module. In embodiments, the transmission signals may be based on the AC transmit signal. For example, the communication circuitry 218 of the antenna module 206 may be configured to receive one AC transmit signal 213 from the controller 214, and transmit one or more transmission signals 207 based on the AC transmit signal 213.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An antenna system comprising:
  a communication sub-system disposed within an aircraft, the communication sub-system comprising:
    one or more power supply components configured to generate a direct current (DC) power supply; and
    a first capacitive coupling device configured to capacitively couple an alternating current (AC) transmit signal to the DC power supply to form an antenna input signal;
  an antenna module disposed on the aircraft configured to receive the antenna input signal, the antenna module comprising:
    a second capacitive coupling device configured to de-couple the DC power supply and the AC transmit signal; and
    communication circuitry configured to generate one or more transmission signals based on the AC transmit signal; and an electrical line configured to transmit the antenna input signal from the communication sub-system to the antenna module.

2. The antenna system of claim 1, wherein the first capacitive coupling device is configured to capacitively couple the AC transmit signal and one or more additional AC signals to the DC power supply to form the antenna input signal.

3. The antenna system of claim 2, wherein the one or more additional AC signals comprise an AC clock signal including clock synchronization data.

4. The antenna system of claim 2, wherein the one or more additional AC signals comprise an AC control signal including one or more control commands configured to selectively adjust one or more characteristics of the antenna module.

5. The antenna system of claim 2, wherein the antenna input signal includes the AC transmit signal at a first frequency range, and the one or more additional AC signals at one or more additional frequency ranges different from the first frequency range.

6. The antenna system of claim 1, wherein the communication circuitry of the antenna module is further configured to:
generate one or more AC feedback signals, and transmit the one or more AC feedback signals to the communication sub-system via the second capacitive coupling device and the electrical line.

7. The antenna system of claim 6, wherein the one or more AC feedback signals comprise an antenna module status signal.

8. The antenna system of claim 1, wherein the communication circuitry of the antenna module is further configured to:
receive one or more signals from one or more transmitting devices and generate a one or more AC receive signals based on the one or more received signals.

9. The antenna system of claim 8, wherein the second capacitive coupling device is further configured to:
capacitively couple the one or more AC receive signals to the DC power supply, wherein the electrical line is then configured to transmit the one or more AC receive signals from the antenna module to the communication sub-system.

10. The antenna system of claim 1, wherein the AC transmit signal comprises an analog AC transmit signal.

11. The antenna system of claim 1, wherein the AC transmit signal comprises a digital AC transmit signal.

12. The antenna system of claim 11, wherein the antenna module further comprises:
an analog-to-digital converter (ADC) device configured to receive the digital AC transmit signal and generate an analog AC transmit signal, wherein the communication circuitry of the antenna module is configured to generate the one or more transmission signals based on the analog AC transmit signal.

13. The antenna system of claim 1, wherein the electrical line comprises a coaxial cable.

14. The antenna system of claim 1, wherein the electrical line is routed from the communication sub-system to the antenna module through a port within an exterior surface of a pressure vessel of the aircraft.

15. A method of operating an antenna system, comprising:
generating a direct current (DC) power supply with one or more power supply components of a communication sub-system;
capacitively coupling an alternating current (AC) transmit signal to the DC power supply to form an antenna input signal with a first capacitive coupling device;
transmitting the antenna input signal from the communication sub-system to an antenna module;
de-coupling the DC power supply and the AC transmit signal with a second capacitive coupling device; and
transmitting one or more transmission signals with communication circuitry of the antenna module, the transmission signals based on the AC transmit signal.

\* \* \* \* \*